H. ZUM WALDE.
HARROW.
APPLICATION FILED MAR. 20, 1909.
983,331.
Patented Feb. 7, 1911.
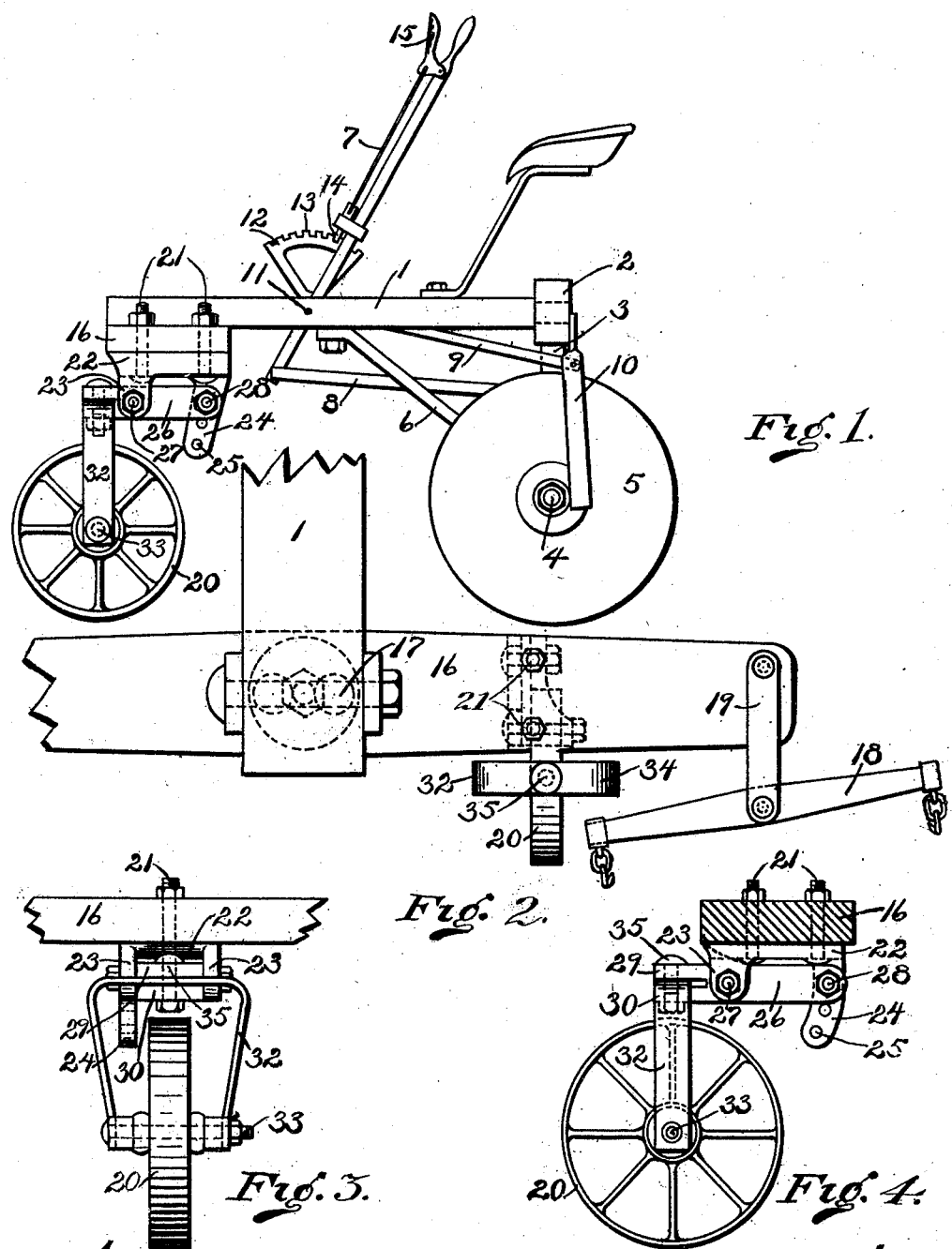

UNITED STATES PATENT OFFICE.

HENRY ZUM WALDE, OF DE MOSSVILLE, KENTUCKY.

HARROW.

983,331.     Specification of Letters Patent.     Patented Feb. 7, 1911.

Application filed March 20, 1909. Serial No. 484,668.

*To all whom it may concern:*

Be it known that I, HENRY ZUM WALDE, a citizen of the United States, residing at De Mossville, in Pendleton county, and State of Kentucky, have invented certain new and useful Improvements in Harrows, of which the following is a specification.

My invention belongs to that class of harrows, known in the art as "disk harrows". The object of my invention is to so form and assemble the various parts of the harrow that the shaft and the disks it carries and the double tree and wheels thereon, are closely coupled together, so as to prevent lateral motion, in this way I need no tongue attachment for the harrow and apply direct force to the disks so that they do absolutely perfect work.

Another feature of my invention, is to provide means for moving the wheels independently, so that the wheel at the inside of the turn, turns first to direct the course of the harrow.

Another feature consists in the adjustability of the wheels to produce forward stretch.

Another feature consists in direct attachment of the swingletree to the double tree carrying the wheels.

My harrow is simple in construction, cheap of manufacture, efficient in use, and makes a compact and unique appearance.

In the accompanying drawing forming part of this specification Figure 1 is a view in elevation of my new harrow. Fig. 2 is a plan view of the double tree and one swingletree and wheel, the beam and double tree being partly broken away. Fig. 3 is a front view of the wheels, yoke, and connecting parts attached to the double tree, which is broken away at each side. Fig. 4 is a side view of the same construction shown in Fig. 3 the double tree being in section.

I may employ any ordinary frame for the harrow.

In the present instance I provide a center bar 1 to the rear end of which I attach a cross bar 2. Connecting pieces 3 extend from the cross bar 2 down to the axle 4 and a series of disks 5 are suitably connected to the axle 4, brace arms as 6 extending from the axle 4 to the center bar 1 for strengthening the frame. The disks 5 are operated through a series of levers 7, 8, 9 and 10 suitably connected together and to the frame and disks. On the center bar 1 I attach a segment 12 having teeth 13 and a ratchet 14, the ratchet 14 operating in and out of teeth 13 through agency of lever 7 and handle 15; when the lever 7 is moved forward and backward to work the disks 5, through the agency of said levers 7, 8, 9 and 10 heretofore mentioned.

The mechanism just described is old and only described here so that my invention will more readily be understood.

The center bar or beam 1 is connected to the front cross beam or double tree 16 by bolt and nut connection 17, swingletrees as 18 are attached to the double tree 16 by a strap 19 or in any other desired manner.

The double tree 16 may be of any form and shape as may also the swingletree 18.

The wheels 20 are operated independently and move, operate and are hung and adjusted as follows, to-wit:—A double hanger is attached to the double tree 16 by nut and bolt connection 21. This double hanger is composed of a plate 22, having depending lugs 23, and at the rear a depending arm 24 provided with a series of holes 25. Of course this hanger may be made of any shape or contour and connected to the double tree in any desired manner. Between the lugs 23 and extending back to the depending arm 24 is a cross arm or adjustable block 26, connected at the front to lugs 23 by a bolt 27 and at the rear connected to depending arm 24 by a bolt 28. At its forward end the cross bar or adjustable block 26 is divided into two parts 29, 30, a space being left between these parts to admit of the upper part of the yoke 32. In this yoke or frame 32 the wheel 20 is swung by axle 33. The upper part 34 of the yoke 32 passes into the space or recess between the parts 29 and 30 of the cross arm 26 and is pivoted between them by a pivot 35, thus the yoke 32 carrying the wheel is movable in the hanger, so that the wheel will move to the right or left according to the direction the harrow is being pulled by the horses, or guided by the operator.

If it is desired to move the yoke 32 and wheels 20 forward or farther out from the double tree, the bolt connection 28 is removed, the arm 26 moved down at the rear and the bolt connection 28 placed in one of the lower holes 25 in the depending arm 24, this forces the yoke and wheel out forward at an incline, thus increasing the distance between the wheels and disks, which may be desirable in many instances for turning the harrow.

It will be seen that the wheels are almost under the double tree, that the distance between the double tree and disks is very short, that the wheels by reason of being hung in pivoted hangers will move toward the left or right accordingly as the horses are pulling, and that the distance between the front and rear parts can be increased or diminished by the adjustment of the parts which carry and connect the wheels.

I can apply my invention to any form of harrow and do not limit it to the particular form herein shown, but prefer to use it in connection with a disk harrow.

What I claim as new and of my invention and desire to secure by Letters Patent is:—

1. In a truck for implements, a double tree, an adjustable block connected to said double tree at each side, hangers carrying wheels depending from and swinging in said adjustable blocks at their forward ends, arms extending downward from the double tree at each side, said arms provided with holes for adjustment, a bolt connection passing through said holes and through the rear end of the adjustable blocks, by means of which the wheels may be moved forward and backward, as set forth.

2. In a truck for implements, a double tree, plates attached to said double tree at each side thereof, said plates having at their forward ends depending lugs and at their rear depending arms provided with holes, adjustable blocks passing between said depending lugs and extending backward to the depending arms, bolts passing through the depending lugs and the adjustable blocks at their forward ends; at their rear the blocks held in position by a bolt passing through said blocks and one of the holes in the depending arms, hangers carrying wheels pivoted in the forward ends of the adjustable blocks so that said hangers and wheels will swing, combined as set forth.

Witness my hand at De Mossville Pendleton county, Kentucky this 17th day of July A. D. 1908.

HENRY ZUM WALDE.

In the presence of—
JOHN ELBERT,
R. M. MULLINS.